April 17, 1962  O. E. ALSTAD ETAL  3,030,223
BONDING STRUCTURE FOR LAMINATES
Filed Feb. 2, 1959
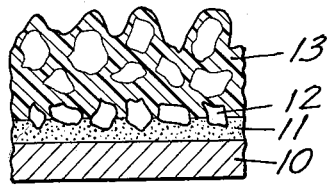
INVENTORS
ORVAL E. ALSTAD
JAN D. VAN DEN BERGH
BY
Carpenter, Abbott, Coulter & Kinney
ATTORNEYS

United States Patent Office 3,030,223
Patented Apr. 17, 1962

3,030,223
BONDING STRUCTURE FOR LAMINATES
Orval E. Alstad, White Bear Lake, and Jan D. van den Bergh, St. Paul, Minn., assignors to Minnesota Mining and Manufacturing Company, St. Paul, Minn., a corporation of Delaware
Filed Feb. 2, 1959, Ser. No. 790,688
6 Claims. (Cl. 117—26)

This invention relates to sheet laminates highly resistant to delamination, and to a method for making the same.

Following the practice of this invention, it is possible to firmly bond a layer of coatable plastic material to a continuous sheet backing even though the sheet backing presents a highly non-adhesive surface to the plastic layer and even through the plastic layer itself exhibits relatively poor adhesion to any prime coating of adhesive having adhesive affinity for the backing. The transitional bonding structure between a continuous sheet backing and a plastic layer thereover, as taught herein, has been used to prepare laminates which cannot be separated at the interface of their layers (i.e., attempts at separation have resulted in tearing of the plastic layer itself).

The teachings hereof are particularly useful in preparing a non-slip floor covering material, as illustrated hereinafter.

The invention will be described by reference to a drawing, made a part hereof, wherein a magnified schematic cross-sectional view of a laminate of the invention is illustrated.

Referring to the drawing, the essential parts of our structure include a continuous flexible sheet backing 10, a prime coating 11 over the sheet backing, a plurality of discrete deformable yieldingly resilient particles 12 distributed over the prime coating and firmly adhered thereto, and a flexible organic plastic layer 13 over the deformable particles and portions of the prime coating 11 between such particles.

While flexible tough organic film sheet backings (e.g., polyethylene, polyethylene terephthalate, polypropylene, etc.) will usually be used in the practice of this invention, primarily because they are materials to which many plastic coatable substances do not readily adhere and therefore create problems to which the present invention provides a ready solution, no limitation of the inventive structure to laminates of which such materials are a part is to be inferred, since the bonding structure hereof may be useful even in the case of fabric sheet backings or treated sheet backings such as described in Kugler and Oakes United States Patent 2,357,335, or Oakes United States Patent 2,357,350, as well as others.

A flexible organic backing film which has desirable toughness for a large number of uses, but to which many coatable organic plastic materials do not readily adhere, is polyethylene terephthalate ("Mylar"). The benefits of the invention show up particularly strikingly where such a backing film is used.

A particularly effective prime adhesive which readily clings to polyethylene terephthalate surfaces, and forms a firm bond therewith, is illustrated in the detailed example to follow. It comprises a polyisocyanate coating, preferably flexible in nature. Plasticization or suitable flexibilizing of polyisocyanates may be accomplished, for example, by adding polychloroprene to the primer or by inter-reacting a polyester resin therewith. It has been suggested that the type of bond formed between the surface of polyethylene terephthalate and an isocyanate primer is one wherein something more than a mere mechanical interlocking or a physical affinity is involved. Likely the polar groups in the isocyanate orient or react themselves in some way with the film of polyethylene terephthalate to give a strong bond. However, this may or may not be a full explanation. It is offered merely to illustrate that many different forces may play a part in gaining adhesion between interfaces; thus, the adhesive bond of a primer coating may primarily be of one type for some surfaces and primarily of another type for others. In cases where continuous sheet backings other than polyethylene terephthalate are employed, it is, of course, necessary to employ a suitable priming adhesive over the continuous sheet backing which possesses a suitable or specific affinity for the surface of the backing. For example, a vulcanizable rubber latex primer for cloth backings may be useful. The general concept of employing a priming adhesive coating between laminates of a structure and selecting suitable priming adhesives which possess affinity for a sheet backing as well as a layer to be adhered or affixed to the backing, is well understood by those skilled in the art and need not further be explained herein. It will also be evident that primers other than polyisocyanates may be satisfactory for polyethylene terephthalate backings. As a further illustration, an interreacted mixture of a bisamide and a polyester (e.g., a mixture of liquid N,N'-bis-ethylenisosebacamide, and a polyester of adipic acid, diethylene glycol, and trimethylol propane reacted to an acid number of 50–60) may be applied at 100% solids and cured to form a prime coating (e.g., a bis 1,2-alkylene amide cured polyester layer) of strong adhesion to polyethylene terephthalate as well as other surfaces.

The nature of the particles 12 coated over an applied prime coating on the sheet backing has surprisingly been found to be rather critical in the formation of the transitional bonds here described. The particles must be deformable or somewhat compressible. They preferably should not be so highly absorptive of liquid prime coatings as to completely absorb priming materials of a coating therebeneath, and thereby disrupt the continuity of bond; however, absorptive particles may be used in situations where, for example, the prime coat is applied as a hot melt and cooled or cured after the particles are applied before they have a chance to greatly absorb priming adhesive. As a further expedient, absorptive particles may be treated or filled or sealed so as to reduce their absorption properties. Suitable particles preferably are yieldingly resilient; but they need not necessarily be so resilient as to recover instantaneously from deformation. Practical particles for a wide variety of structures are those of ground vulcanized scrap rubber of a size distribution between approximately 10 and 100 mesh, preferably between approximately 30 and 100 mesh. While the batch of rubber particles to be applied over the prime coating may contain a small amount of larger or smaller rubber particles, precautions should usually be taken to prevent a sufficient amount of extremely small rubber particles (e.g., dust-like particles smaller than 100 mesh) from completely covering all spaces between the 10–100 mesh rubber particles scattered on the prime coating. Generally at least 10% of the area of the prime coating, preferably at least 30%, should be covered with the resilient particles in order to gain the advantages of the invention. At the other extreme, while as much as 95% of the area of the prime coating can be covered or occupied by resilient particles in contact therewith, it is preferred that the particles cover not more than about 80% of the area so that void formation at the interface between the prime coating and the applied plastic layer is kept to a minimum. As used herein, "rubber" refers to compounds of natural rubber, as well as synthetic rubber elastomers or polymers having rubbery properties (e.g., polychloroprenes, butadiene-styrenes, bisamide polymers which are rubber-like, etc.), as well as various mixtures of such materials. Rubber compositions for the particles will usually be treated or vulcanized so as to be suitably tough, deformable and yieldingly resilient.

Since most adhesive primers for the practice of this invention exhibit an affinity to surfaces of rubber, no particular problem is presented in gaining suitably strong adhesion between the dropped rubber particles and the prime adhesive coating. However, it may be desirable to preliminarily treat some organic films to improve adhesion of a primer, or to employ a prime adhesive coating exhibiting strong adhesion to the backing but weak adhesion to the deformable particles. In such cases it will be well within the skill of the art to employ a further prime adhesive coat having suitable adhesion to the primed surface of the backing as well as to the deformable particles. In essence, such multiple prime coatings amount to a "prime adhesive coat" as discussed herein.

A specific illustration of a coatable plastic layer which can be firmly bonded to a backing using the principles of this invention is one comprising a flexible deformable rubber-resin matrix in which a plurality of compressible resilient particles such as rubber or cork are randomly distributed. The invention will be found applicable, however, for a variety of rubber or resinous plastic composition layers, even though they may be free of embedded particles. It is particularly useful where the plastic layer employed is of a composition different from that of the deformable particles, the primer and the backing, and where the plastic layer exhibits low adhesion to the backing when applied directly thereover.

In forming the structures hereof a prime coating of adhesive is first applied to the backing sheet. While the prime coating is still liquid and flowable, the resilient particles are applied thereover; and then the prime coating is hardened or solidified, as by curing, usually partial curing at this stage in fabrication. The plastic layer is then applied and the structure given any further treatment or the like, e.g., further curing, as may be desired.

The following is offered as a specific nonlimitative illustration of a structure of the invention.

A priming solution was applied to one side of a two mil thick film of biaxially oriented polyethylene terephthalate at a coating weight of approximately 8 grains per 24 sq. in. The priming solution was prepared by mixing together 10 parts by weight of an ethyl acetate solution (75% solids) of the low-volatility polyfunctional reaction product of a mixture of tolylene di-isocyanate and trimethylolpropane having a NCO:OH ratio of 2:1 ("Mondur CB" of Mobay Chemical Co.), 15 parts of a flexible crepe-like cream-colored isocyanate-reactive polyester resin (e.g., "Multranil BY–176" of Mobay Chemical Co., believed to be formed by reacting a di-isocyanate, e.g., naphthalene 1,5-di-isocyanate, with an excess of polyester resins, e.g., polyethylene adipate), and 85 parts of Cellosolve acetate solvent. (The polyester resin and polyisocyanate reaction product are heat-reactive, the end product being flexibilized by the polyester resin component.)

Before evaporating the solvent from the primer coating, approximately 15 grains per 24 sq. in. of ground scrap vulcanized rubber particles of a size small enough to pass a 38 mesh screen (approximately 90% of the volume of the particles being in the range of 38–100 mesh) were dropped on the prime coating; after which solvent was removed and the prime coat pre-cured for 30 minutes at 200° F.

A slurry was then coated over the foregoing structure and treated to form the plastic layer of the product.

A mill base for the slurry was prepared by milling 50 parts by weight of polychloroprene rubber ("neoprene type W"), and one part of an antioxidant (e.g., phenyl beta naphthylamine; "Neozone D") on a rubber mill until the rubber was plastic and easily workable, which required about 15 minutes of milling during which time the temperature of the neoprene rose to about 200° F. Next one part of carbon black pigment was blended in. Curing agents for the neoprene were next blended with the mass, and for this 2 parts of magnesium oxide ("Maglite M") and 2.5 parts of zinc oxide were used. Lastly, about 0.5 part of a curing accelerator, i.e., 2-mercaptoimidazoline, was added and milled into the mass.

To this mill base was then added 5 parts of ethyl alcohol, 150 parts of toluol and 42.5 parts of an oil-soluble, heat-advancing, p - tertiary-butyl phenol-formaldehyde resin ("Super-Beckacite 1001") having a softening point, as determined by the capillary tube method, of approximately 60–70° C. This resin is heat-advancing in that on heating it first becomes soft and then, after continued heating, becomes a hard insoluble mass. The resulting rubber-resin solution contained approximately 39% nonvolatile material and had a viscosity of about 2000 cps.

To 100 parts of rubber-resin solution just described was added 6 parts by weight of ground scrap rubber particles of the same type as dropped on the prime coating. The mixture was stirred thoroughly to produce a slurry. The slurry was applied to the rubber particle-coated side of the polyethylene terephthalate film at a coating weight of approximately 200 grains per 24 sq. in.

Since a highly protuberated plastic anti-slip surface was desired for this particular laminate, approximately 12 grains (per 24 sq. in. of backing) of 20–40 mesh cork particles were dropped over this slurry coating. Solvent was then evaporated and the slurry coating given a pre-cure at approximately 30 minutes at 220° F. A coversize coating was then applied over the cork particles, and for this approximately 60 grains per 24 sq. in. of the rubber-resin solution previously described was used. The resulting sheet laminate was then gradually heated to 250° F. over a 90 minute period, and retained at this temperature for 60 minutes, after which it was again gradually lowered to room temperature.

The strength of the bond between the cured, non-tacky plastic coating and the polyethylene terephthalate backing was then tested. One test involved rubbing the end of a 3/16 inch square steel bar, at a force of about 10 pounds, back and forth a distance of about 4¼ inches at a cycling rate of about 60 times per minute over the plastic surface of the laminate layer to determine the resistance of the plastic layer against delamination from the backing by scuffing. About 25 cycles (a cycle being one complete back and forth movement) were sufficient for the results set forth in the table below to become apparent. In a separate test, an attempt was made to strip the polyethylene terephthalate backing from the plastic layer by gripping a plastic-free end of the backing and pulling it at an angle of approximately 180 degrees back over itself. For this 180 degree strip-back test, it was necessary to adhesively affix the plastic layer to a panel, such as pine board, by a strong rupture-resistant bond. A suitable one may be formed by spreading a film containing a rubbery butadiene-acrylonitrile elastomer with a phenol-aldehyde-type resin ("Scotchweld") between the plastic layer and panel, applying pressure, and heat-curing the film at about 275° F.

Using the foregoing tests, the article of the foregoing detailed example was compared with several other laminates, similar in many respects except for the transitional bonding structure of this invention. The results of the tests are set forth in the following table.

| Structure[1] | Scuff Resistance | 180° Strip Back Test |
|---|---|---|
| 1. Structure of foregoing example. | Excellent | Excellent (failure in plastic layer and not next to primer). |
| 2. Plastic directly on "Mylar" (No primer and no rubber particle drop-coat). | Poor | Poor (Plastic strips away from backing essentially as unitary structure). |
| 3. Primer used but no rubber particle drop-coat. | Fair | Fair (Failure irregular and spotty next to primer). |
| 4. Grit 80 Al₂O₃ used instead of rubber particle drop-coat (35 grains of Al₂O₃ per 24 sq. in.). | Good to Excellent. | Similar to Example 3. |
| 5. No rubber drop-coat; primer contained 7 parts by weight of precipitated CaCO₃ powder. | Fair | Do. |
| 6. Same as 5 except 18 parts CaCO₃ used. | do | Do. |

[1] All structures were as set forth in the foregoing detailed example except as noted.

From the table it is apparent that the particular structure of this invention gives surprisingly tough and sturdy bonds, even though one might at first glance consider the expedient of coating a primer with yieldingly resilient particles to be a step in the wrong direction for obtaining a strong bond. Ordinarily, the surfaces of a prime coating of adhesive are carefully kept free of contamination, presumably on the assumption that the function of the prime coating as a transitional bond between layers of a laminate would be destroyed by contamination. It was, therefore, particularly surprising to discover that laminates of improved resistance to delamination could be formed as aforespecified.

This specification is to be construed in its broadest aspect and as an illustration of the essential features of the invention, which is further defined and set forth in the claims appended hereto.

That which is claimed is:

1. A sheet material having a transitional bonding structure between a continuous sheet backing and a flexible organic plastic layer thereover, said bonding structure serving to hold said plastic layer and sheet backing together as an integral unit highly resistant to delamination, the said bonding structure comprising a prime adhesive coating on said sheet backing and exhibiting high adhesion thereto, with a multitude of discrete deformable particles of a size range from 10 to 100 mesh essentially uniformly and randomly distributed over said prime coating and firmly adherent thereto, said particles projecting into said plastic layer and acting in combination with the contact bond between said prime coating and said plastic layer to hold said plastic layer firmly in place, the coating weight of said plastic layer being at least twice that of the coating weight of the prime adhesive coating.

2. The structure of claim 1 wherein the sheet backing comprises a flexible tough organic film.

3. A unitary sheet article comprising a continuous sheet backing and a plastic layer consisting essentially of an essentially continuous organic plastic matrix in which a multitude of compressible resilient particles of a size range from about 10 to 100 mesh are randomly distributed, said sheet article having a transitional bonding structure between said sheet backing and said plastic layer holding the two together as an integral unit highly resistant to delamination, the said bonding structure comprising adhesive material as a prime coating on said continuous sheet backing and exhibiting high adhesion thereto, with a multitude of discrete deformable, yieldingly resilient rubber particles of a size range from 10 to 100 mesh essentially uniformly and randomly distributed oved said prime coating and firmly adherent thereto, said particles projecting into said plastic layer and acting in combination with said prime coating to firmly hold said plastic layer against delamination from said sheet backing, the coating weight of said plastic layer being at least twice that of the coating weight of said prime coating.

4. The sheet article of claim 3 wherein the sheet backing is polyethylene terephthalate and the prime coating of the transitional bonding structure comprises a polyisocyanate adhesive composition.

5. The sheet article of claim 3 wherein the sheet backing is polyethylene terephthalate and the prime coating of the transitional bonding structure comprises a bisamide adhesive composition.

6. A method of forming a transitional bonding structure for firmly uniting a continuous sheet backing with a flexible organic plastic layer, comprising coating said continuous sheet backing with a flowable priming adhesive composition exhibiting high adhesion thereto, distributing a multitude of discrete deformable particles of a size range from 10 to 100 mesh in a random pattern over said priming adhesive coating, solidifying the priming adhesive coating, and coating over the foregoing structure a flexible organic plastic composition which remains flexible upon curing, the coating weight of said organic plastic composition being at least twice that of the coating weight of said priming adhesive composition.

References Cited in the file of this patent

UNITED STATES PATENTS

| 969,449 | Blake | Sept. 6, 1910 |
| 1,182,200 | Norris | May 9, 1916 |
| 2,024,072 | Smoyer | Dec. 10, 1935 |
| 2,330,365 | Jackson | Sept. 28, 1943 |
| 2,494,848 | Whitelegg | Jan. 17, 1950 |
| 2,542,058 | Riedesel | Feb. 20, 1951 |
| 2,698,242 | Saner | Dec. 28, 1954 |
| 2,723,935 | Rodman | Nov. 15, 1955 |